(12) United States Patent
Nakahara et al.

(10) Patent No.: US 11,945,531 B2
(45) Date of Patent: Apr. 2, 2024

(54) STEERING DEVICE

(71) Applicant: HONDA MOTOR CO., LTD., Tokyo (JP)

(72) Inventors: Satoshi Nakahara, Tokyo (JP); Hayato Miyakawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 222 days.

(21) Appl. No.: 17/677,352

(22) Filed: Feb. 22, 2022

(65) Prior Publication Data

US 2022/0297751 A1     Sep. 22, 2022

(30) Foreign Application Priority Data

Mar. 22, 2021 (JP) .................. 2021-047541

(51) Int. Cl.
*B62D 6/00* (2006.01)
*B60K 35/00* (2006.01)
(Continued)

(52) U.S. Cl.
CPC .............. *B62D 6/002* (2013.01); *B60K 35/00* (2013.01); *B62D 15/022* (2013.01);
(Continued)

(58) Field of Classification Search
CPC .. B62D 6/002; B62D 15/022; B62D 15/0225; B62D 15/0205; B62D 15/029; B62D 15/021; B62D 5/006; B62D 5/0463; B62D 1/105; B60K 35/00; B60K 2370/152; B60K 2370/171; B60K 2370/1523; B60K 2370/782
See application file for complete search history.

(56) References Cited

U.S. PATENT DOCUMENTS 1,396,195 A * 11/1921 Grigsby ................. B62D 1/105
                                                        24/135 R
3,543,874 A * 12/1970 Nevett .................... B60K 37/00
                                                        74/498
(Continued)

FOREIGN PATENT DOCUMENTS

CN         106985898 A        7/2017
JP         S6069752 U         5/1985
(Continued)

OTHER PUBLICATIONS

Notice of Reasons for Refusal for Japanese Patent Application No. 2021-047541 dated Nov. 8, 2022; 5 pp.
(Continued)

*Primary Examiner* — Phutthiwat Wongwian
*Assistant Examiner* — Sherman D Manley
(74) *Attorney, Agent, or Firm* — Armstrong Teasdale LLP (57) ABSTRACT

A steer-by-wire type steering device includes: a steering support part fixed to a vehicle body; a steering shaft rotatably supported by the steering support part; a steering wheel fixed part fixed to the steering support part; and a steering wheel rotation part connected to the steering shaft and rotatably disposed on an outer circumference of the steering wheel fixed part, wherein the steering wheel rotation part is formed in rotational symmetry with respect to a rotation axis thereof.

13 Claims, 7 Drawing Sheets

(51) Int. Cl.
 *B62D 15/02* (2006.01)
 *B60K 35/22* (2024.01)
 *B60K 35/28* (2024.01)

(52) U.S. Cl.
 CPC .......... *B62D 15/0225* (2013.01); *B60K 35/22* (2024.01); *B60K 35/28* (2024.01); *B60K 2360/171* (2024.01)

(56) References Cited

U.S. PATENT DOCUMENTS

| | | | | |
|---|---|---|---|---|
| 3,548,128 A * | 12/1970 | Willett | .................... | B62D 1/185 200/61.57 |
| 4,572,313 A * | 2/1986 | Ono | ....................... | B62D 1/105 74/498 |
| 4,638,287 A * | 1/1987 | Umebayashi | .......... | B62D 1/105 439/131 |
| 4,743,883 A * | 5/1988 | Yoshimi | ................. | B62D 15/02 340/672 |
| 4,759,235 A * | 7/1988 | Hiramitsu | .............. | B62D 1/105 74/484 R |
| 4,796,482 A * | 1/1989 | Hiramitsu | .............. | B62D 1/105 200/61.54 |
| 5,465,632 A * | 11/1995 | Oki | ........................ | B62D 1/187 74/484 R |
| 6,227,327 B1 * | 5/2001 | Nigrin | ..................... | B62D 1/12 74/552 |
| 7,878,294 B2 * | 2/2011 | Morikawa | .............. | B62D 5/008 180/204 |
| 10,036,843 B2 * | 7/2018 | Lisseman | ................ | G02B 6/0083 |
| 10,046,786 B2 * | 8/2018 | Lisseman | ................ | F21S 45/47 |
| 10,272,940 B2 * | 4/2019 | Staehle | .................... | B62D 1/00 |
| 10,293,856 B2 * | 5/2019 | Oya | ........................ | B62D 15/027 |
| 10,449,927 B2 * | 10/2019 | Simon | .................... | B62D 5/001 |
| 11,110,938 B2 * | 9/2021 | Mega | ........................ | G08G 1/16 |
| 11,338,848 B2 * | 5/2022 | Stahl | ........................ | B62D 5/06 |
| 11,383,749 B1 * | 7/2022 | Kuehner | ............... | B62D 15/025 |
| 2003/0197360 A1 * | 10/2003 | Shimizu | .............. | F16H 19/0659 280/771 |
| 2007/0099465 A1 * | 5/2007 | Ruetz | .................... | B62D 5/001 439/164 |
| 2013/0002416 A1 * | 1/2013 | Gazit | ................... | B62D 15/027 701/23 |
| 2013/0276571 A1 * | 10/2013 | Takayasu | ................ | B62D 1/04 74/552 |
| 2013/0298716 A1 * | 11/2013 | Salvini | ................... | B62D 1/105 74/492 |
| 2014/0244115 A1 * | 8/2014 | Sanma | ................... | B60K 35/50 701/42 |
| 2017/0106894 A1 * | 4/2017 | Bodtker | ................ | B62D 1/105 |
| 2017/0144688 A1 * | 5/2017 | Pitzer | .................... | B62D 15/02 |
| 2017/0210411 A1 | 7/2017 | Kogure | | |
| 2017/0233050 A1 * | 8/2017 | Tosini | ....................... | F16H 1/10 74/507 |
| 2018/0229767 A1 * | 8/2018 | James | .................... | B62D 5/006 |
| 2019/0002010 A1 * | 1/2019 | Cao | ...................... | B62D 5/0412 |
| 2019/0276050 A1 | 9/2019 | Mega et al. | | |
| 2020/0171947 A1 * | 6/2020 | Derrick | ................ | B60K 35/22 |
| 2020/0172037 A1 * | 6/2020 | Klaenhammer | ...... | B60R 21/203 |
| 2020/0283052 A1 * | 9/2020 | Scheick | ................ | B62D 1/046 |
| 2021/0129838 A1 * | 5/2021 | Hultén | .................. | B60W 10/20 |
| 2021/0291889 A1 * | 9/2021 | Maeshiro | ............... | B62D 6/008 |
| 2022/0144295 A1 * | 5/2022 | Hwang | ................... | B60W 50/12 |
| 2023/0041535 A1 * | 2/2023 | Pásztor | ................. | B62D 6/002 |
| 2023/0264738 A1 * | 8/2023 | Watanabe | ............ | B62D 5/0469 180/402 |

FOREIGN PATENT DOCUMENTS

| | | |
|---|---|---|
| JP | 2004338442 A | 12/2004 |
| JP | 2006327421 A | 12/2006 |
| JP | 2007153109 A | 6/2007 |
| JP | 2016196248 A | 11/2016 |
| JP | 2018083523 A | 5/2018 |
| WO | 2016157717 A1 | 10/2016 |

OTHER PUBLICATIONS

Office Action for Chinese Patent Application No. 202210162336.2 dated Jan. 31, 2024; 9 pp.

\* cited by examiner

STEERING DEVICE

TECHNICAL FIELD

The present invention relates to a steer-by-wire type steering device.

BACKGROUND ART

JP2007-153109A discloses a steer-by-wire type steering device. The steer-by-wire type steering device includes a steering shaft rotatably supported on a vehicle body, a steering wheel joined to one end of the steering shaft, a steering angle sensor that detects a steering angle, which is a rotation angle of the steering shaft, a steering mechanism that steers a tire by a driving force of a steering motor, and a control device that calculates a control amount of the steering motor based on the steering angle.

In the steering device disclosed in JP2007-153109A, if the steering wheel is rotated (turned) when the steering device is not in operation, a discrepancy occurs between the steering wheel angle, which is the rotation angle of the steering wheel, and the tire angle. Therefore, when activated, the steering device rotates the steering wheel or steers the tire to make the steering wheel angle and the tire angle match each other. However, if the steering wheel is automatically rotated or the tire is automatically steered, it may make an occupant of the vehicle feel discomfort. The occupant recognizes the steering wheel angle from the appearance of the steering wheel and recognizes a discrepancy between the steering wheel angle and the tire angle. Therefore, an appropriate design of the appearance of the steering wheel may make it unnecessary to adjust the angle of the steering wheel and/or the tire when the steering device is activated.

SUMMARY OF THE INVENTION

In view of the foregoing background, a primary object of the present invention is to provide a steer-by-wire type steering device in which angle adjustment of the steering wheel or the tire can be omitted.

To achieve the above object, one aspect of the present invention provides a steer-by-wire type steering device (1) comprising: a steering support part (11) fixed to a vehicle body (5); a steering shaft (12) rotatably supported by the steering support part; a steering wheel fixed part (13) fixed to the steering support part; and a steering wheel rotation part (14) connected to the steering shaft and rotatably disposed on an outer circumference of the steering wheel fixed part, wherein the steering wheel rotation part is formed in rotational symmetry with respect to a rotation axis (A1) thereof.

According to this aspect, since the steering wheel rotation part is formed in rotational symmetry, the driver cannot recognize the steering wheel angle, which is the rotation angle of the steering wheel rotation part, from the appearance of the steering wheel. Therefore, even if the steering wheel angle changes while the steering device is not in operation, it is not necessary to actually rotate the steering wheel rotation part or to steer the tire. Namely, in the steer-by-wire type steering device, angle adjustment by rotating the steering wheel rotation part or by steering the tire can be omitted.

In the above aspect, preferably, the steering device comprises: a steering wheel angle sensor (31) that detects a rotation angle of the steering wheel rotation part relative to the steering wheel fixed part as a steering wheel angle; an indicator (17) provided on the steering wheel fixed part; and a control device (9) that controls the indicator, wherein the control device makes the indicator display a second display (46) according to the steering wheel angle.

According to this aspect, the driver can recognize the steering wheel angle by viewing the indicator.

In the above aspect, preferably, the indicator is formed in a circular shape, and an angle of the second display about a central axis (A1) of the indicator changes according to the steering wheel angle.

According to this aspect, the driver can recognize the steering wheel angle based on the position of the second display displayed on the indicator.

In the above aspect, preferably, when the steering wheel angle is greater than or equal to 360 degrees, the control device makes the indicator further display a third display (47).

According to this aspect, the driver can recognize that the steering wheel angle is greater than or equal to 360 degrees based on the third display displayed on the indicator.

In the above aspect, preferably, the steering device comprises a tire angle sensor (41) that detects a tire angle of a steered wheel, wherein when activating the steering device, the control device sets the steering wheel angle corresponding to the tire angle and performs the second display according to the steering wheel angle.

According to this aspect, the steering device can make the driver recognize the steering wheel angle matching the tire angle.

In the above aspect, preferably, the steering device comprises: a tire angle sensor (41) that detects a tire angle of a steered wheel; an indicator (17) provided on the steering wheel fixed part; and a control device (9) that controls the indicator, wherein the control device sets a steering wheel angle corresponding to the tire angle and makes the indicator display a second display (46) according to the steering wheel angle.

According to this aspect, the driver can recognize the steering wheel angle by viewing the indicator.

In the above aspect, preferably, the indicator is formed in a circular shape, and an angle of the second display about a central axis (A1) of the indicator changes according to the steering wheel angle.

According to this aspect, the driver can recognize the steering wheel angle based on the position of the second display displayed on the indicator.

In the above aspect, preferably, when the steering wheel angle is greater than or equal to 360 degrees, the control device makes the indicator further display a third display (47).

According to this aspect, the driver can recognize that the steering wheel angle is greater than or equal to 360 degrees based on the third display displayed on the indicator.

In the above aspect, preferably, the steering device comprises: a tire angle sensor (41) that detects a tire angle of a steered wheel; an indicator (17) provided on the steering wheel fixed part; and a control device (9) that controls the indicator, wherein the control device makes the indicator display a first display (45) according to the tire angle.

According to this aspect, the driver can recognize the tire angle by viewing the indicator.

In the above aspect, preferably, the indicator is formed in a circular shape, and an angle of the first display about a central axis (A1) of the indicator changes according to the tire angle.

According to this aspect, the driver can recognize the tire angle based on the position of the first display displayed on the indicator.

In the above aspect, preferably, the central axis of the indicator is disposed coaxially with the rotation axis of the steering wheel rotation part.

According to this aspect, since the rotational center of the first display on the indicator matches the rotational center of the steering wheel rotation part, the driver can recognize the steering wheel angle easily based on the first display.

In the above aspect, preferably, the steering wheel rotation part is disposed coaxially with the steering shaft.

According to this aspect, the configuration of the steering device can be made simple.

In the above aspect, preferably, the steering wheel rotation part and the steering shaft are connected to each other via a planetary gear mechanism (21), the planetary gear mechanism comprises a sun gear (22) joined to the steering shaft, an internal gear (23) joined to the steering wheel rotation part, and multiple planetary gears (24) rotatably supported by the steering support part or the steering wheel fixed part and engaging with the sun gear and the internal gear, and the steering shaft is applied a reaction force torque from a reaction force actuator (26).

According to this aspect, the planetary gear mechanism can increase the reaction force torque from the reaction force motor and transmit the increased reaction force torque to the steering wheel rotation part.

In the above aspect, preferably, the steering wheel fixed part and the steering wheel rotation part are each formed in a circular shape having a center on an axis (A1) of the steering shaft, and an outer diameter of the steering wheel rotation part is larger than an outer diameter of the steering wheel fixed part.

According to this aspect, it is possible to improve the design of the steering device.

According to the foregoing configuration, it is possible to provide a steer-by-wire type steering device in which angle adjustment by rotation of the steering wheel and the tire can be omitted.

DETAILED DESCRIPTION OF THE INVENTION

Figure 1:
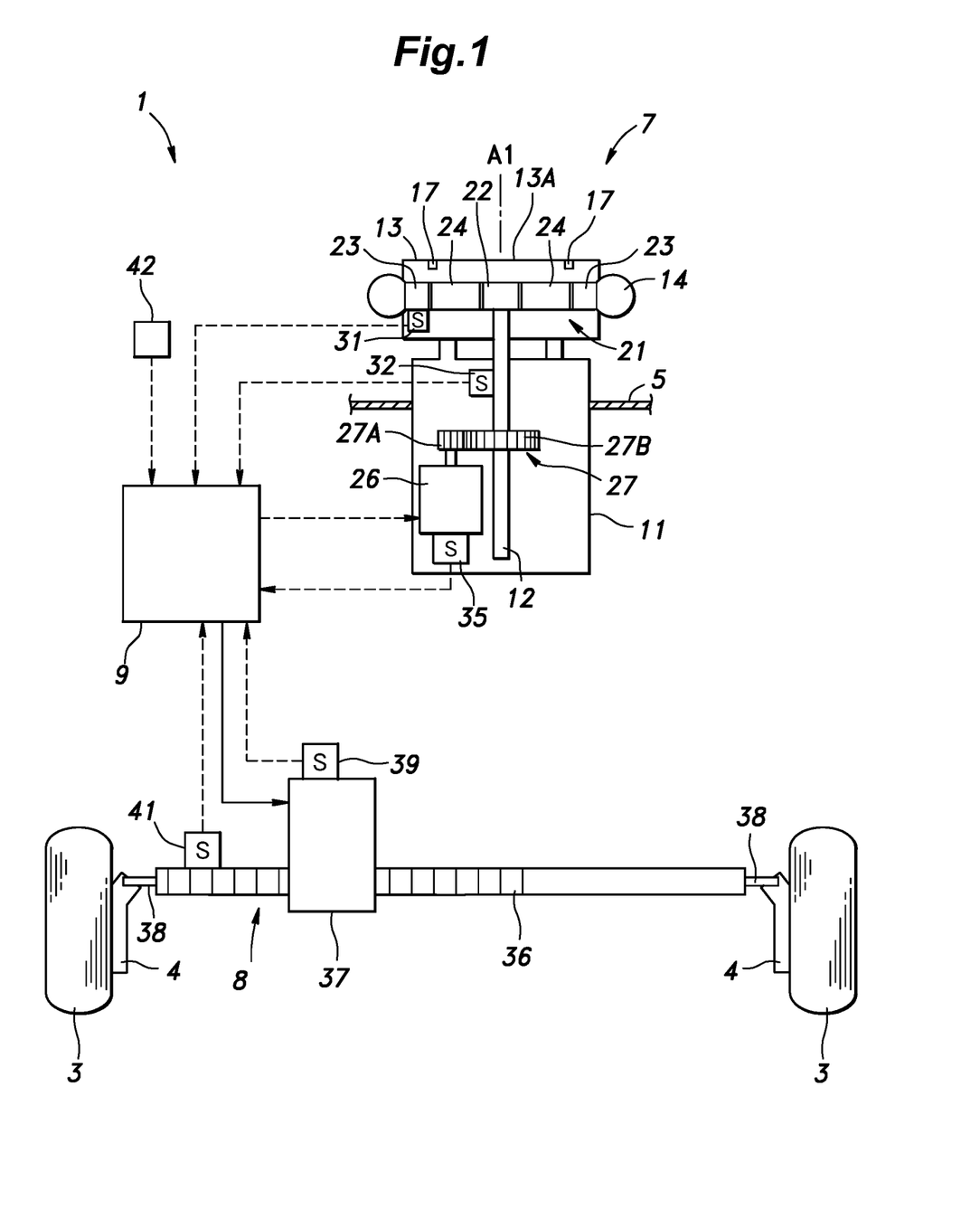
FIG. 1 is a configuration diagram of a steering device according to the first embodiment of the present invention.

In the following, an embodiment of a steering device for a vehicle according to the present invention will be described. As shown in FIG. 1, a steering device 1 according to the first embodiment is a steer-by-wire (SBW) type steering device. The vehicle provided with the steering device 1 is a four-wheeled automobile provided with left and right front wheels 3 and left and right rear wheels (not shown in the drawings). Each of the left and right front wheels 3 is supported on a vehicle body 5 via a knuckle 4 such that the tire angle (steered angle) can be changed and functions as a steered wheel. The tire angle is an angle of the front wheels 3 relative to the fore and aft direction in plan view. The steering device 1 changes the tire angle of the front wheels 3.

The steering device 1 includes a steering operation receiving mechanism 7 that receives a steering operation performed by the driver, a steering mechanism 8 that steers the front wheels 3, and a control device 9 that controls the steering operation receiving mechanism 7 and the steering mechanism 8.

The steering operation receiving mechanism 7 includes a steering support part 11 fixed to the vehicle body 5, a steering shaft 12 rotatably supported by the steering support part 11, a steering wheel fixed part 13 fixed to the steering support part 11, and a steering wheel rotation part 14 connected to the steering shaft 12 and rotatably disposed on an outer circumference of the steering wheel fixed part 13. The rotation angle of the steering wheel rotation part 14 relative to the steering wheel fixed part 13 is referred to as a steering wheel angle. The steering wheel fixed part 13 and the steering wheel rotation part 14 constitute a steering wheel.

The steering support part 11 is formed in a cylindrical shape. The vehicle body 5 includes a dash panel that separates the engine room from the cabin, and the steering support part 11 is attached to the dash panel and extends forward and rearward from the dash panel. The steering support part 11 is a so-called steering column. Preferably, the steering shaft 12 is formed in a columnar shape and is rotatably supported inside the steering support part 11 via a bearing or the like. The steering shaft 12 and the steering support part 11 extend along a first axis A1. The rear end of the steering shaft 12 protrudes rearward from the rear end of the steering support part 11.

The steering wheel fixed part 13 is joined to the rear end of the steering support part 11. Namely, the steering wheel fixed part 13 is unrotatably joined to the vehicle body 5 via the steering support part 11. The steering wheel fixed part 13 is formed in a disc shape and is disposed coaxially with the first axis A1. The outer diameter of the steering wheel fixed part 13 is larger than the outer diameter of the steering support part 11. Namely, the steering wheel fixed part 13 extends in the radial direction of the first axis A1 from the rear end of the steering support part 11. The steering wheel fixed part 13 is provided at a rear portion thereof with a planar end surface 13A that is substantially perpendicular to the first axis A1.

Figure 3:
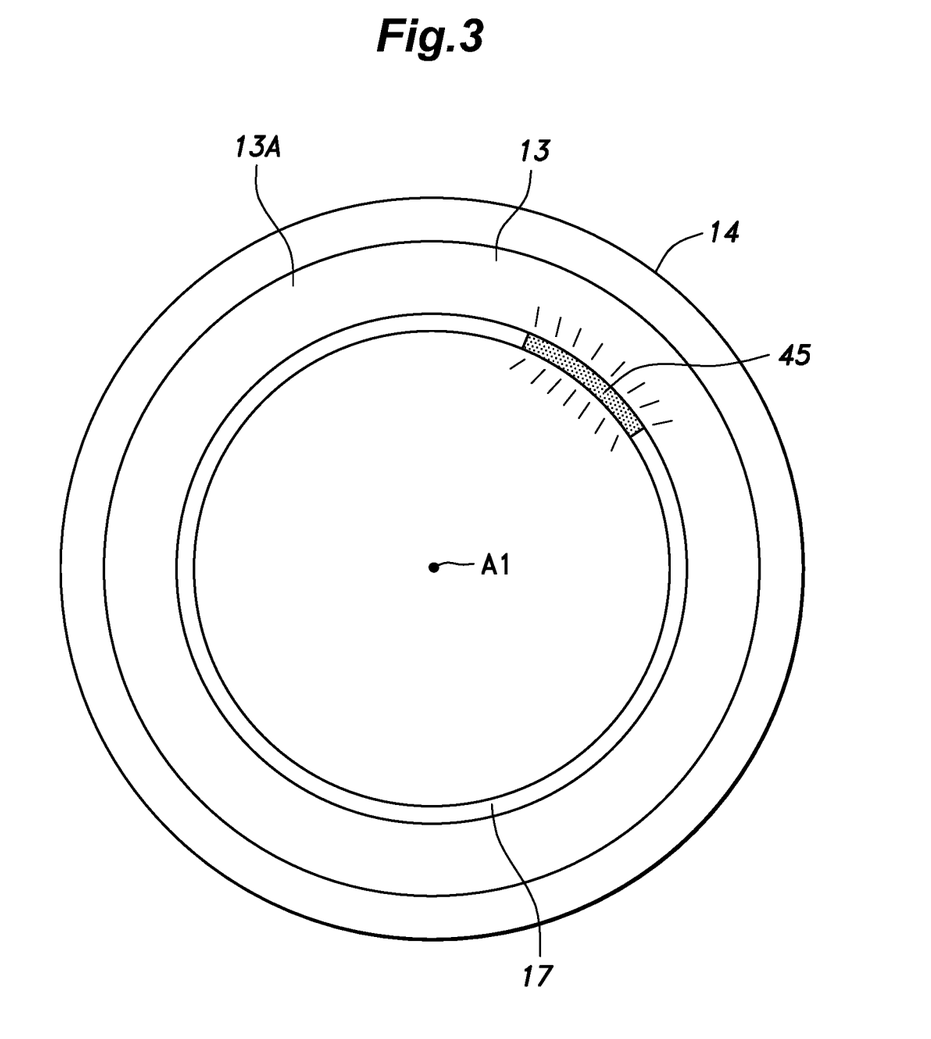
FIG. 3 is an explanatory diagram showing a steering wheel fixed part and an indicator.

As shown in FIGS. 1 and 3, the end surface 13A of the steering wheel fixed part 13 is provided with an indicator 17. The indicator 17 is preferably formed by a light emitting device including a liquid crystal display, multiple LEDs, or the like. The indicator 17 displays at least one of a display according to the tire angle of the front wheels 3, which are the steered wheels, and a display according to the steering wheel angle. For example, the indicator 17 may be formed in an annular shape having a center on the first axis A1 and be configured such that various parts thereof in the circumferential direction can be lit on and off. Such an indicator 17 may be formed, for example, by annularly arranged LEDs, by an annular liquid crystal display, or by an outer circumferential part of a circular liquid crystal display.

Figure 2:
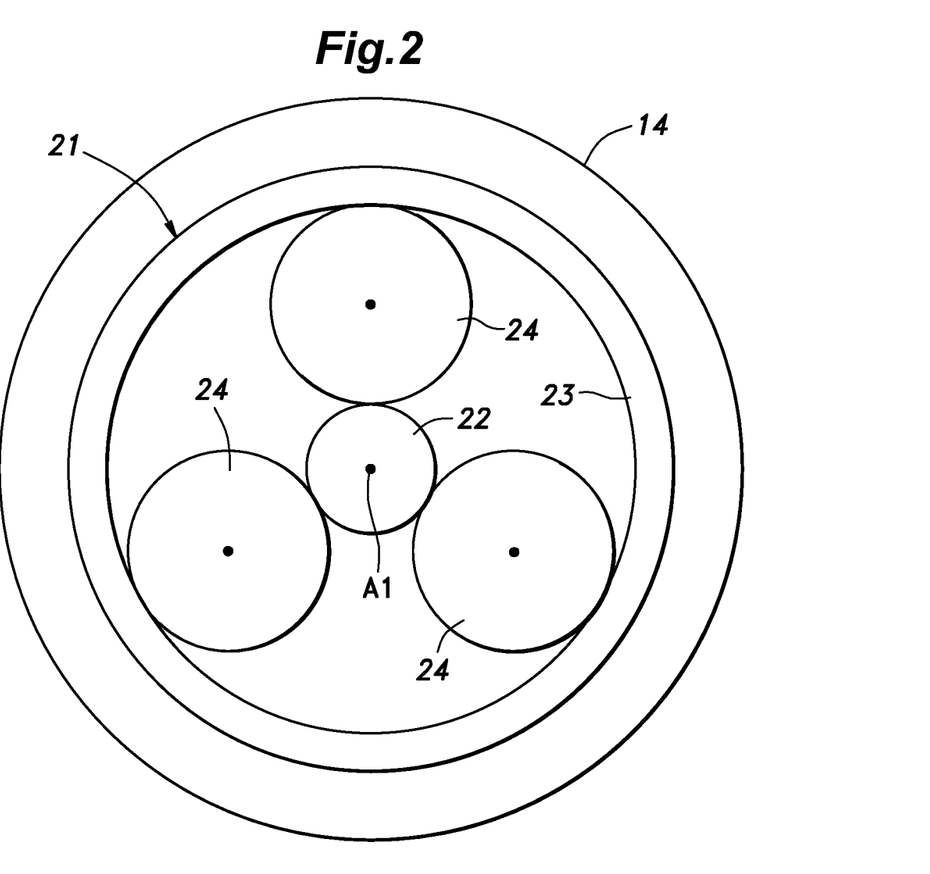
FIG. 2 is an explanatory diagram showing a steering wheel rotation part and a planetary gear mechanism.

As shown in FIGS. 1 and 2, the steering wheel rotation part 14 and the steering shaft 12 are connected to each other via a planetary gear mechanism 21. The planetary gear mechanism 21 is disposed inside the steering wheel fixed part 13. The planetary gear mechanism 21 includes a sun gear 22 joined to the steering shaft 12, an internal gear 23 joined to the steering wheel rotation part 14, and multiple planetary gears 24 rotatably supported on the steering wheel fixed part 13 and engaging with the sun gear 22 and the internal gear 23. The planetary gear mechanism 21 is disposed coaxially with the first axis A1.

The rear end of the steering shaft 12 extends into an interior of the steering wheel fixed part 13 and is coaxially joined to the sun gear 22. It is possible that the multiple planetary gears 24 are each rotatably supported on a planetary carrier and the planetary carrier is fixed to the steering wheel fixed part 13. However, in the present embodiment, the planetary carrier is omitted, and the multiple planetary gears 24 are each rotatably supported on the steering wheel fixed part 13.

The steering wheel rotation part 14 is formed in an annular shape. The steering wheel rotation part 14 is joined to the outer circumference of the internal gear 23 on the inner circumference thereof and rotates integrally with the internal gear 23. The rotation axis of the steering wheel rotation part 14 is disposed coaxially with the first axis A1.

The steering wheel rotation part 14 is formed in rotational symmetry with respect to the rotation axis. In the present embodiment, the outer diameter of the steering wheel rotation part 14 is formed in a circular shape having a center on the rotation axis (the first axis A1). The outer diameter of the steering wheel rotation part 14 is larger than the outer diameter of the steering wheel fixed part 13. The steering wheel rotation part 14 is grasped by the driver and receives a steering operation performed by the driver.

The rotation of the steering wheel rotation part 14 is transmitted to the steering shaft 12 in the opposite rotation direction and with a rotational speed increased by a gear ratio R1, where the gear ratio R1 is expressed by Zc/Za provided that the number of teeth of the sun gear 22 is Za and the number of teeth of the internal gear 23 is Zc.

The steering operation receiving mechanism 7 includes a reaction force actuator 26 that applies a reaction force torque to the steering shaft 12. The reaction force actuator 26 preferably is an electric motor. The output shaft of the reaction force actuator 26 is connected to the steering shaft 12 via a reduction drive mechanism 27. The reduction drive mechanism 27 preferably includes a first gear 27A provided on the output shaft and a second gear 27B provided on the outer circumference of the steering shaft 12. The number of teeth of the second gear 27B is greater than the number of teeth of the first gear 27A. Thereby, the reaction force torque generated by the reaction force actuator 26 is increased by the reduction drive mechanism 27 and transmitted to the steering shaft 12.

The steering device 1 includes a steering wheel angle sensor 31 that detects a rotation angle of the steering wheel rotation part 14 relative to the steering wheel fixed part 13 as a steering wheel angle. The steering wheel angle sensor 31 may be a known rotary encoder.

The steering device 1 includes a torque sensor 32 that detects a torque applied to the steering shaft 12 as a steering torque. The torque sensor 32 detects the steering torque applied to a part of the steering shaft 12 between the sun gear 22 and the reaction force actuator 26. The steering torque is determined by an operation torque applied to the steering shaft 12 by the driver via the steering wheel rotation part 14 and the planetary gear mechanism 21 and a reaction force torque applied to the steering shaft 12 by the reaction force actuator 26. The torque sensor 32 may be a known torque sensor such as a magnetostriction type torque sensor or a strain gauge, or may be configured to utilize an estimated value based on a value of an electric current flowing through the electric motor of the reaction force actuator 26.

The steering device 1 includes a first rotation angle sensor 35 that detects a rotation angle of the reaction force actuator 26. The first rotation angle sensor 35 may be a known resolver or rotary encoder.

The steering mechanism 8 includes a rack shaft 36 extending in the vehicle width direction and a steering actuator 37 that drives the rack shaft 36. The rack shaft 36 is supported by the vehicle body 5 to be movable in the vehicle width direction. The left and right end portions of the rack shaft 36 are connected to the respective knuckles 4 supporting the left and right front wheels 3 via respective tie rods 38. When the rack shaft 36 is moved in the vehicle width direction, the steered angle of the front wheels 3 is changed. The steering mechanism 8 is mechanically separated from the steering operation receiving mechanism 7.

The steering actuator 37 includes an electric motor and a pinion joined to the output shaft of the electric motor and engaging with the rack shaft 36. Based on the signal from the control device 9, the steering actuator 37 moves the rack shaft 36 in the vehicle width direction and thereby changes the tire angle of the left and right front wheels 3.

The steering device 1 includes a second rotation angle sensor 39 that detects a rotation angle of the steering actuator 37. The second rotation angle sensor 39 may be a known resolver or rotary encoder. Also, the steering device 1 includes a tire angle sensor 41 that detects a tire angle of the front wheels 3, which are the steered wheels. In the present embodiment, the tire angle sensor 41 is a rack stroke sensor that detects a rack position, which is a position of the rack shaft 36 in the vehicle width direction, and the tire angle sensor 41 detects the tire angle of the front wheels 3 based on the rack position.

The control device 9 is an electronic control unit including a CPU, a memory, a storage device storing programs, and so on. The control device 9 is connected with the steering wheel angle sensor 31, the torque sensor 32, the first rotation angle sensor 35, the second rotation angle sensor 39, and the tire angle sensor 41. Based on the signals from these sensors, the control device 9 acquires the steering wheel angle, the steering torque, the rotation angle of the reaction force actuator 26, the rotation angle of the steering actuator 37, and the tire angle.

The control device 9 is connected with a power switch 42 for activating and stopping the steering device 1. The power switch 42 is a so-called ignition switch. The control device 9 activates or stops the steering device 1 based on the signal from the power switch 42.

When activating the steering device 1, the control device 9 acquires the tire angle based on the signal from the tire angle sensor 41 and sets a steering wheel angle corresponding to the tire angle. The relationship between the tire angle and the steering wheel angle may be preferably defined by a map, for example. Preferably, the control device 9 acquires the steering wheel angle based on the tire angle by referring to the map and sets the acquired steering wheel angle as a current steering wheel angle. Thereby, it is possible to make the steering wheel angle and the tire angle match each other (or satisfy a predetermined relationship) without steering the front wheels 3, which are the steered wheels, or rotating the steering wheel rotation part 14.

The control device 9 is connected with the reaction force actuator 26 and the steering actuator 37 and controls the reaction force actuator 26 and the steering actuator 37. The control device 9 controls the steering actuator 37 to realize the tire angle corresponding to the steering wheel angle. Also, the control device 9 controls the reaction force actuator 26 according to the tire angle and the steering torque.

The control device 9 controls the indicator 17 based on at least one of the tire angle and the steering wheel angle. The control device 9 makes the indicator 17 display a first display 45 according to the tire angle. As shown in FIG. 3, the first display 45 preferably is a display whose angle about the central axis of the indicator 17 changes according to the tire angle, for example. The first display 45 preferably has a predetermined length in the circumferential direction of the indicator 17.

Figure 4:
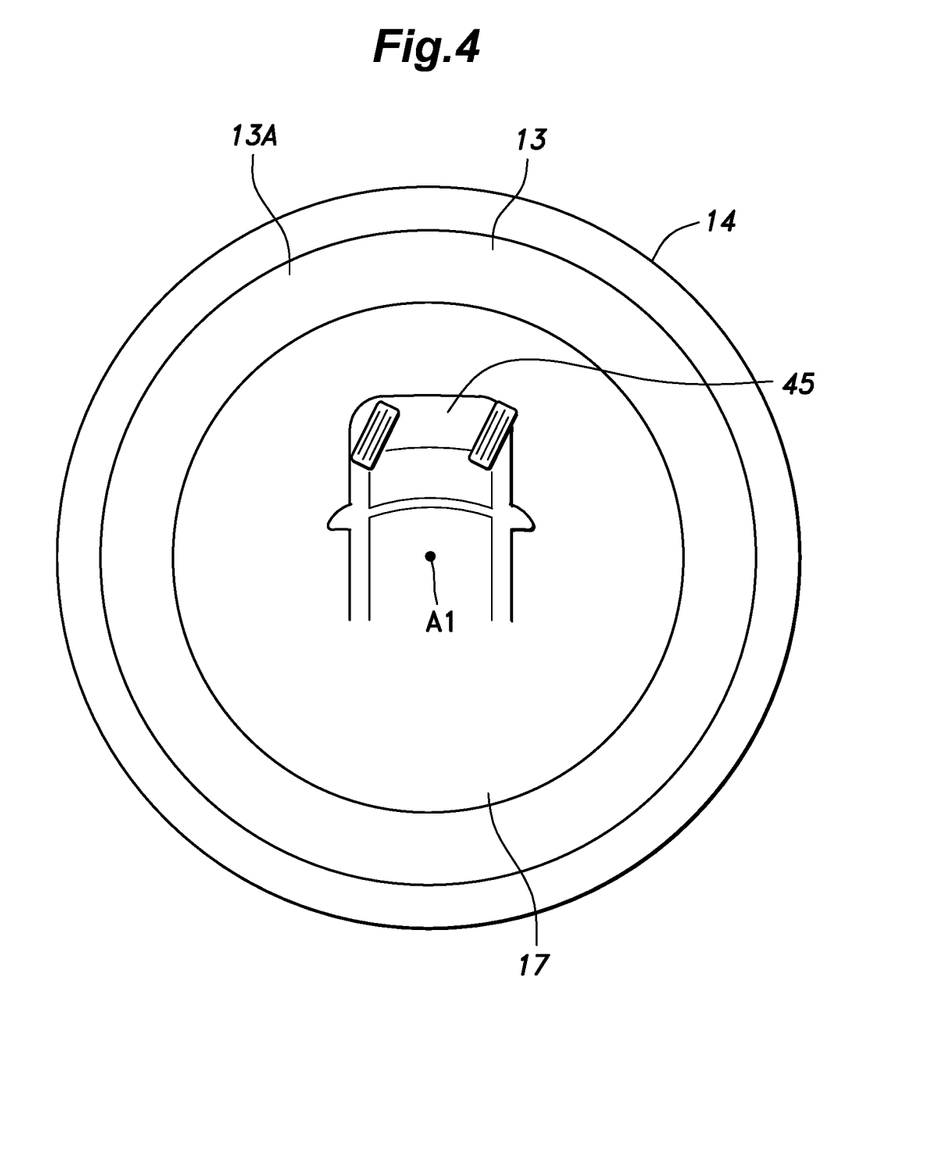
FIG. 4 is another explanatory diagram showing the steering wheel fixed part and the indicator.

Note that the first display 45 may have a variety of shapes. For example, when the indicator 17 is a liquid crystal display, the first display 45 may be a figure or an animation schematically representing a front portion and the front wheels 3 of the vehicle, as shown in FIG. 4. In that case, preferably, the angle of the figure representing the front wheels 3 included in the first display 45 is changed according to the tire angle. The driver can recognize the tire angle by viewing the first display 45 displayed on the indicator 17.

Figure 5:
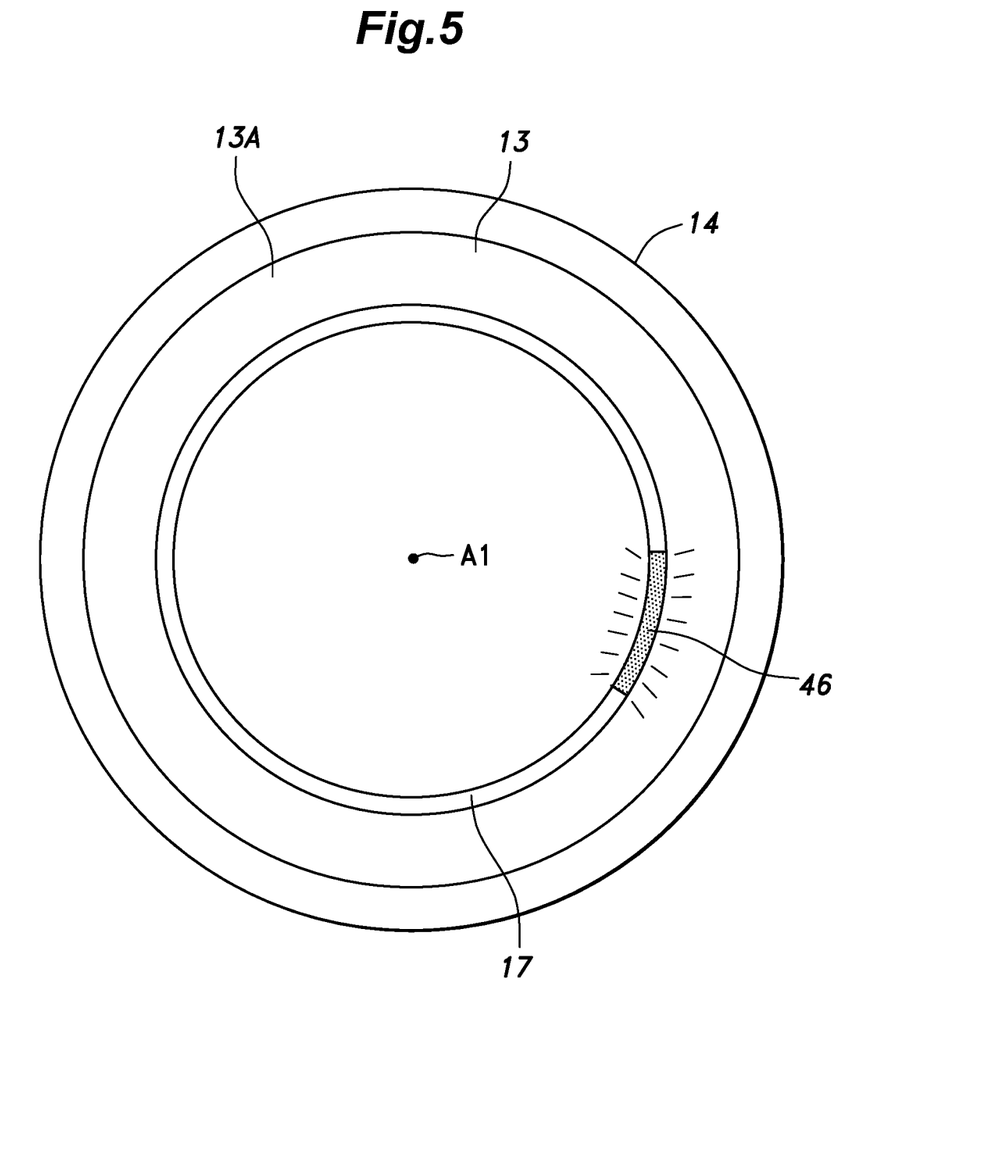
FIG. 5 is another explanatory diagram showing the steering wheel fixed part and the indicator.

The control device 9 may make the indicator 17 display a second display 46 according to the steering wheel angle. As shown in FIG. 5, the second display 46 preferably is a display whose angle about the central axis of the indicator 17 changes according to the steering wheel angle, for example. It is preferred that the angle of the second display 46 about the central axis of the indicator 17 matches the steering wheel angle. The second display 46 preferably has a predetermined length in the circumferential direction of the indicator 17. Note that the second display 46 may have a variety of shapes. The driver can recognize the steering wheel angle by viewing the second display 46 displayed on the indicator 17.

Figure 6:
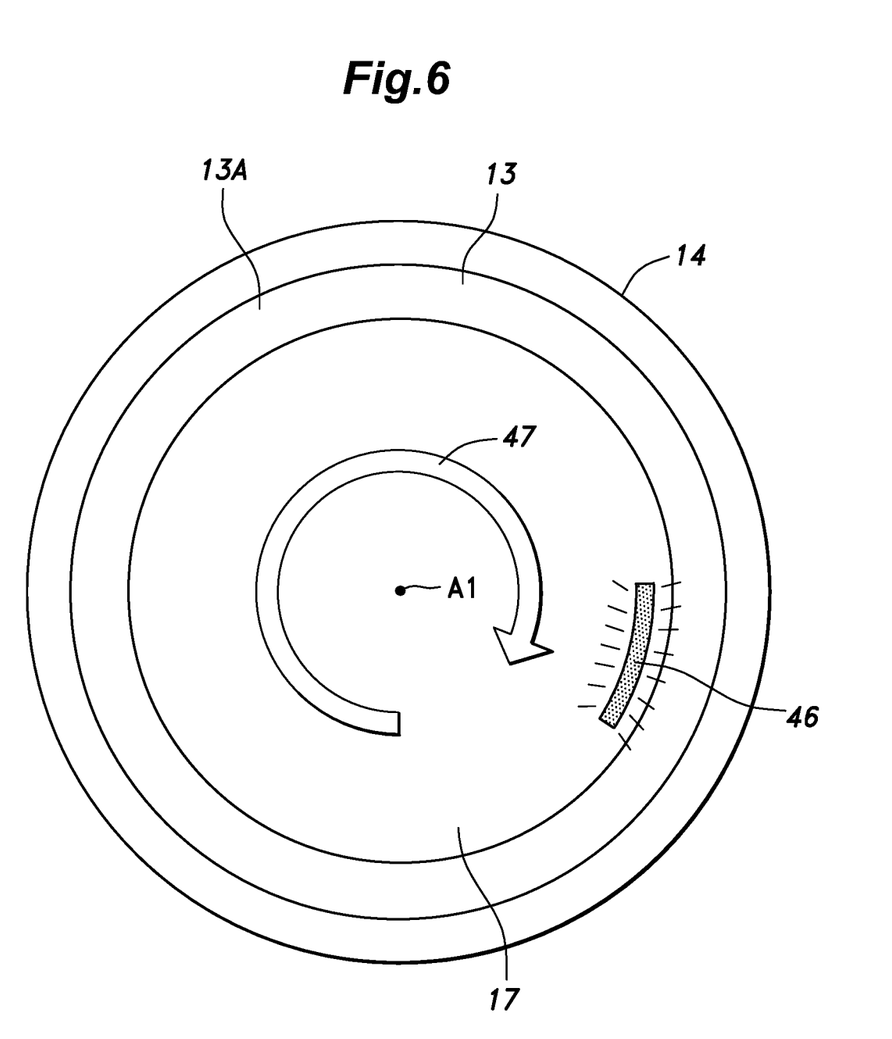
FIG. 6 is another explanatory diagram showing the steering wheel fixed part and the indicator.

Further, when the steering wheel angle is greater than or equal to 360 degrees, the control device 9 preferably makes the indicator 17 display a third display 47. As shown in FIG. 6, the third display 47 is a figure such as an arrow indicating the rotation direction, for example. The third display 47 may be displayed on a right half or a left half of the indicator 17 in correspondence with the rotation direction of the steering wheel rotation part 14. Also, the third display 47 may be highlighted by blinking or expansion and contraction. The driver can recognize that the steering wheel angle is greater than or equal to 360 degrees by viewing the third display 47 displayed on the indicator 17.

In the steering device 1 according to the present embodiment, since the steering wheel rotation part 14 is formed in rotational symmetry, the driver cannot recognize the rotation angle of the steering wheel rotation part 14 from the appearance of the steering wheel. Therefore, even when there is a discrepancy between the rotation angle of the steering wheel rotation part 14 and the tire angle, it is not necessary to actually rotate the steering wheel rotation part 14 or to steer the tire. Namely, in the steer-by-wire type steering device 1, angle adjustment of the steering wheel rotation part 14 and the tire can be omitted.

Figure 7:
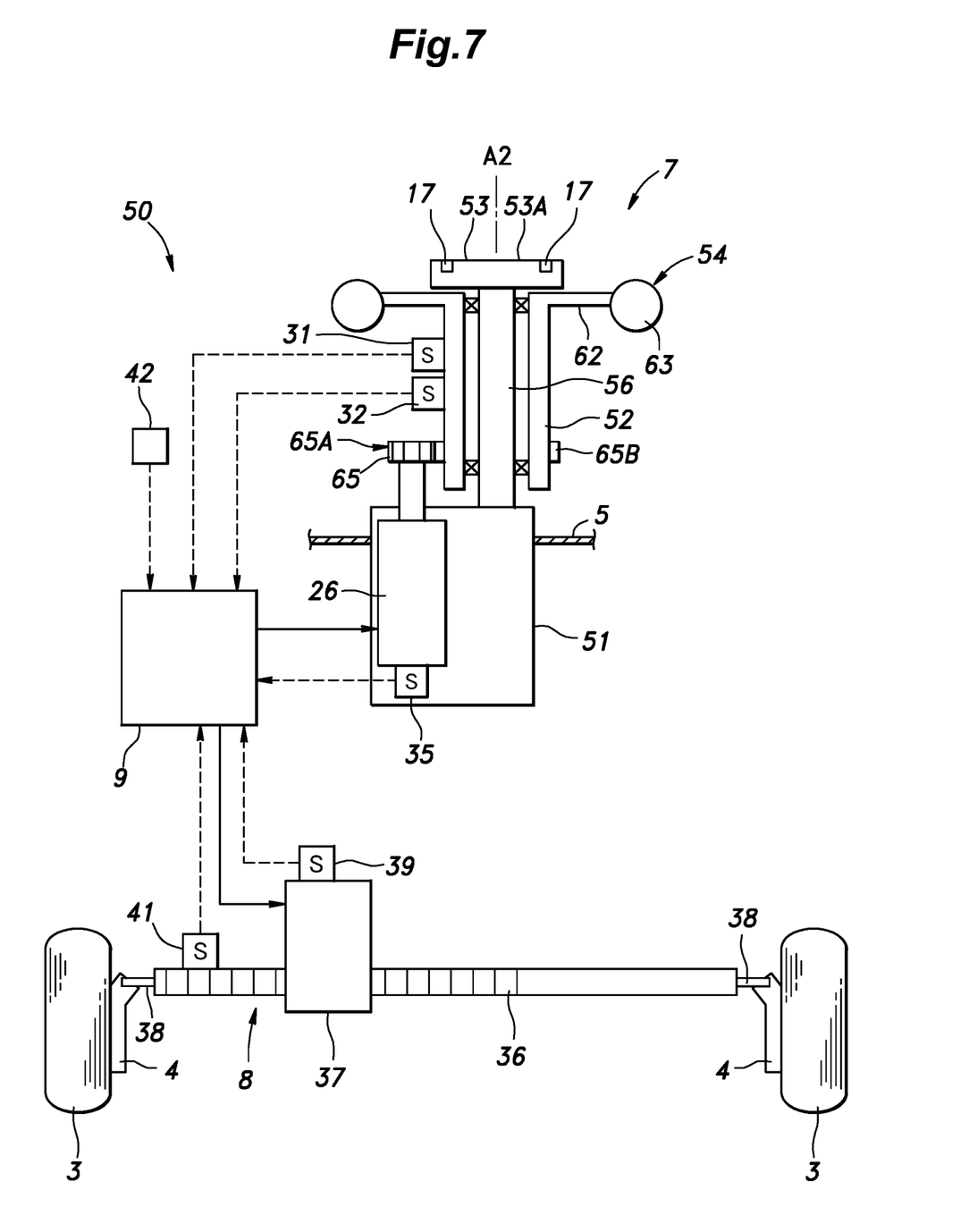
FIG. 7 is a configuration diagram of a steering device according to the second embodiment of the present invention.

A steering device 50 according to the second embodiment of the present invention differs from the steering device 1 according to the first embodiment with respect to the configuration of the steering support part 51, the steering shaft 52, the steering wheel fixed part 53, and the steering wheel rotation part 54. In the steering device 50 according to the second embodiment, the elements similar to those of the steering device 1 according to the first embodiment are denoted by the same reference signs as in the first embodiment and description thereof will be omitted.

As shown in FIG. 7, the steering support part 51 is joined to the dash panel configuring a part of the vehicle body 5. The steering support part 51 has a shaft portion 56 that has a cylindrical columnar shape and extends rearward from the dash panel. The axis of the shaft portion 56 is referred to as a second axis A2. The steering wheel fixed part 53 is joined to the rear end of the shaft portion 56. The steering wheel fixed part 53 is formed in a disc shape and is disposed coaxially with the shaft portion 56. The steering wheel fixed part 53 extends radially outward from the rear end of the shaft portion 56. An end surface 53A of the steering wheel fixed part 53 that faces rearward is provided with the indicator 17.

The steering shaft 52 is formed in a tubular shape and is rotatably supported on an outer circumference of the shaft portion 56. Preferably, a bearing such as a ball bearing is provided between the shaft portion 56 and the steering shaft 52. The steering wheel rotation part 54 includes a disc portion 62 extending radially outward from the rear end of the steering shaft 52 and an annular grip portion 63 provided on the outer circumference of the disc portion 62. The steering shaft 52 and the disc portion 62 and the grip portion 63 of the steering wheel rotation part 54 are arranged coaxially with a second axis A2.

The steering wheel rotation part 54 is formed in rotational symmetry with respect to the second axis A2 (rotation axis). The diameter of the disc portion 62 is set larger than the diameter of the steering wheel fixed part 53. In the direction along the second axis A2, the width of the grip portion 63 is larger than the width of the disc portion 62. The driver performs a steering operation by grasping the grip portion 63 and rotating the steering wheel rotation part 54 relative to the steering wheel fixed part 53.

The reaction force actuator 26 applies a reaction force torque to the outer circumference of the steering shaft 52 via a reduction drive mechanism 65. The reduction drive mechanism 65 includes a first gear 65A provided on the output shaft of the reaction force actuator 26 and a second gear 65B provided on the outer circumference of the steering shaft 52 and engaging with the first gear 65A.

Compared to the steering device 1 according to the first embodiment, in the steering device 50 according to the second embodiment, the planetary gear mechanism 21 is omitted and the structure of the steering wheel fixed part 53 can be made simple.

Concrete embodiments of the present invention have been described in the foregoing, but the present invention is not limited to the above embodiments and may be modified or altered in various ways. For example, the steering wheel rotation part 54 is only required to be rotationally symmetric with respect to the rotation axis and may be formed in a regular polygonal shape having a center on the rotation axis. The greater the number of corners of the regular polygon is, the better. Preferably, the number of corners of the regular polygon is 8 or more, for example. Also, the present invention may be applicable to a steering system configured to steer the left and right wheels independently or a steering system configured to rotate a kingpin shaft with an actuator to achieve large steering.

The invention claimed is:

1. A steer-by-wire type steering device comprising:
a steering support part fixed to a vehicle body;

a steering shaft rotatably supported by the steering support part;
a steering wheel fixed part fixed to the steering support part;
a steering wheel rotation part connected to the steering shaft and rotatably disposed on an outer circumference of the steering wheel fixed part;
a steering wheel angle sensor that detects a rotation angle of the steering wheel rotation part relative to the steering wheel fixed part as a steering wheel angle;
an indicator provided on the steering wheel fixed part; and
a control device that controls the indicator,
wherein the steering wheel rotation part is formed in rotational symmetry with respect to a rotation axis thereof, and
the control device makes the indicator display a second display according to the steering wheel angle.

2. The steering device according to claim 1, wherein the indicator is formed in a circular shape, and
an angle of the second display about a central axis of the indicator changes according to the steering wheel angle.

3. The steering device according to claim 2, wherein when the steering wheel angle is greater than or equal to 360 degrees, the control device makes the indicator further display a third display.

4. The steering device according to claim 2, comprising a tire angle sensor that detects a tire angle of a steered wheel,
wherein when activating the steering device, the control device sets the steering wheel angle corresponding to the tire angle and performs the second display according to the steering wheel angle.

5. A steer-by-wire type steering device comprising:
a steering support part fixed to a vehicle body;
a steering shaft rotatably supported by the steering support part;
a steering wheel fixed part fixed to the steering support part;
a steering wheel rotation part connected to the steering shaft and rotatably disposed on an outer circumference of the steering wheel fixed part;
a tire angle sensor that detects a tire angle of a steered wheel;
an indicator provided on the steering wheel fixed part; and
a control device that controls the indicator,
wherein the steering wheel rotation part is formed in rotational symmetry with respect to a rotation axis thereof, and the control device sets a steering wheel angle corresponding to the tire angle and makes the indicator display a second display according to the steering wheel angle.

6. The steering device according to claim 5, wherein the indicator is formed in a circular shape, and
an angle of the second display about a central axis of the indicator changes according to the steering wheel angle.

7. The steering device according to claim 6, wherein when the steering wheel angle is greater than or equal to 360 degrees, the control device makes the indicator further display a third display.

8. A steer-by-wire type steering device comprising:
a steering support part fixed to a vehicle body;
a steering shaft rotatably supported by the steering support part;
a steering wheel fixed part fixed to the steering support part;
a steering wheel rotation part connected to the steering shaft and rotatably disposed on an outer circumference of the steering wheel fixed part;
a tire angle sensor that detects a tire angle of a steered wheel;
an indicator provided on the steering wheel fixed part; and
a control device that controls the indicator,
wherein the steering wheel rotation part is formed in rotational symmetry with respect to a rotation axis thereof, and the control device makes the indicator display a first display according to the tire angle.

9. The steering device according to claim 8, wherein the indicator is formed in a circular shape, and
an angle of the first display about a central axis of the indicator changes according to the tire angle.

10. The steering device according to claim 1, wherein the central axis of the indicator is disposed coaxially with the rotation axis of the steering wheel rotation part.

11. The steering device according to claim 1, wherein the steering wheel rotation part is disposed coaxially with the steering shaft.

12. The steering device according to claim 1, wherein the steering wheel rotation part and the steering shaft are connected to each other via a planetary gear mechanism,
the planetary gear mechanism comprises a sun gear joined to the steering shaft, an internal gear joined to the steering wheel rotation part, and multiple planetary gears rotatably supported by the steering support part or the steering wheel fixed part and engaging with the sun gear and the internal gear, and
the steering shaft is applied a reaction force torque from a reaction force actuator.

13. The steering device according to claim 1, wherein the steering wheel fixed part and the steering wheel rotation part are each formed in a circular shape having a center on an axis of the steering shaft, and
an outer diameter of the steering wheel rotation part is larger than an outer diameter of the steering wheel fixed part.

* * * * *